United States Patent [19]

Knight

[11] 4,087,030
[45] May 2, 1978

[54] BACKPACK FRAME-BORNE CARRIER FOR A PATIENT OR OTHER LOADS

[76] Inventor: William E. Knight, 5000 Park Pl., Bethesda, Md. 20016

[21] Appl. No.: 630,081

[22] Filed: Nov. 7, 1975

[51] Int. Cl.² .......................................... A47D 13/02
[52] U.S. Cl. .......................................... 224/6; 5/82 R; 224/25 A; 403/385; 403/389
[58] Field of Search ............... 224/5 B, 5 BC, 5 MA, 224/5 Q, 5 Z, 6, 8 A, 9, 10, 11, 12, 20, 25 R, 25 A, 26 R, 5 A, 5 J, 5 N, 5 P, 5.1, 8 R; 5/81 R, 82; 297/183; 403/385, 389, 391, 400

[56] References Cited

U.S. PATENT DOCUMENTS

| 643,969 | 2/1900 | Milne | 403/391 X |
|---|---|---|---|
| 1,233,009 | 7/1917 | Alex | 5/82 X |
| 1,868,084 | 7/1932 | Wheelwright | 403/389 X |
| 2,208,962 | 7/1940 | De Finetti | 224/8 R X |
| 2,569,464 | 10/1951 | Edwards et al. | 403/391 X |
| 3,373,454 | 3/1968 | Curtis | 5/82 X |
| 3,426,367 | 2/1969 | Bradford | 5/82 |
| 3,604,687 | 9/1971 | Moore | 403/391 X |
| 3,610,489 | 10/1971 | Parsons | 224/6 |
| 3,659,760 | 5/1972 | Blood | 224/25 A |
| 3,663,972 | 5/1972 | Denton | 5/82 |
| 3,734,367 | 5/1973 | Jackson | 224/25 A |
| 3,749,429 | 7/1973 | Hauber | 403/385 |
| 3,822,813 | 7/1974 | Carter | 224/10 X |
| 3,861,816 | 1/1975 | Zaidan | 403/389 X |

FOREIGN PATENT DOCUMENTS

| 853,891 | 3/1940 | France | 5/82 |
|---|---|---|---|
| 106,297 | 7/1959 | Norway | 297/183 |
| 112,318 | 11/1944 | Sweden | 224/25 A |
| 71,261 | 6/1915 | Switzerland | 5/82 |
| 8878 of | 1900 | United Kingdom | 5/82 |
| 27,269 of | 1911 | United Kingdom | 5/81 R |

*Primary Examiner*—Trygve M. Blix
*Assistant Examiner*—Winston H. Douglas
*Attorney, Agent, or Firm*—William E. Mouzavires

[57] ABSTRACT

A backpack frame-borne carrier readily and removably attachable at its opposite ends to frame members of backpack frames and permitting the carriage of a patient or other loads, the carrier being supported at the head and shoulder height of human carriers wearing the backpacks. The carrier is arranged to be readily compacted for ease in transport to the place of need and to be quickly assembled for use. Retractable legs support the patient or other loads during rest periods and while bearers are donning or removing the backpacks.

17 Claims, 14 Drawing Figures

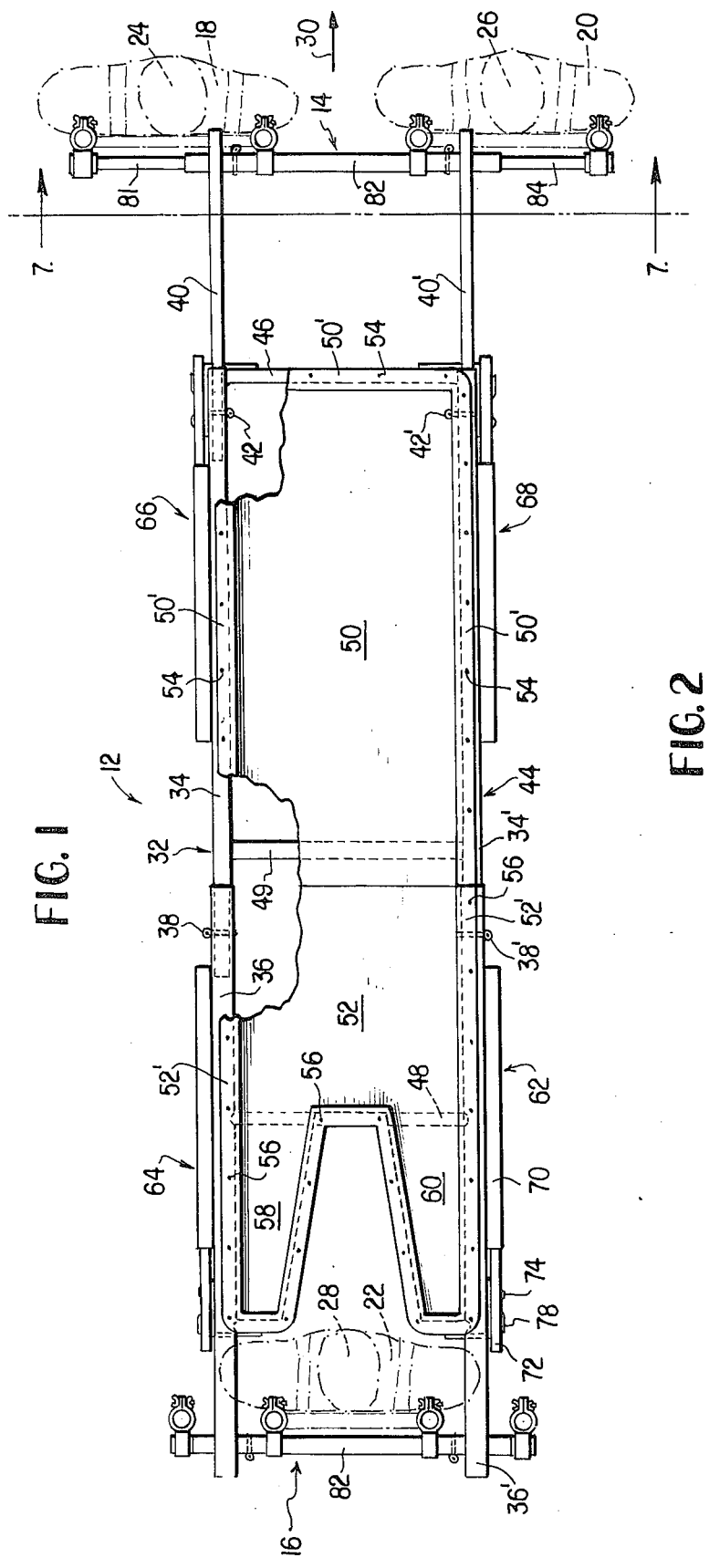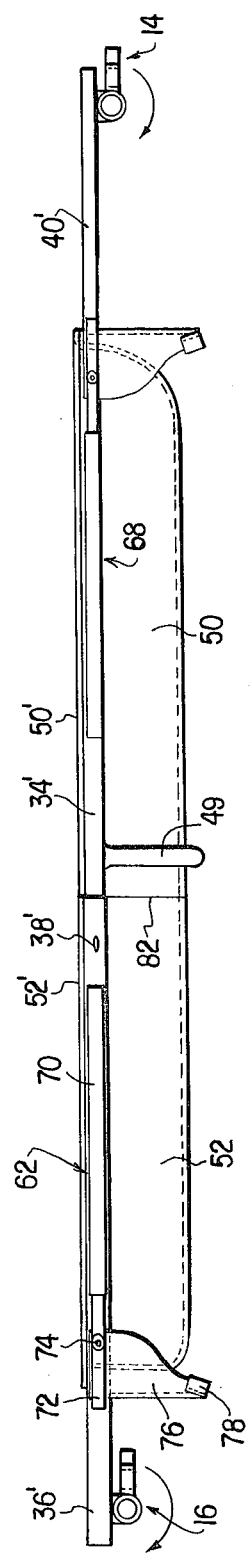
FIG. 1
FIG. 2

BACKPACK FRAME-BORNE CARRIER FOR A PATIENT OR OTHER LOADS

BACKGROUND OF THE INVENTION

A difficult task is presently faced in the evacuation of ill or injured persons from certain locations such as, for example, roadless wilderness areas, when circumstances are such that helicopter transportation is not possible. This may result from the nature of the terrain, the weather, darkness, the absence of communications or the simple unavailability of helicopter services. When, in addition, wheeled stretchers cannot be used, as on mountain trails, patients must be carried out by hand-held litters or stretchers. In the use of these devices the patient's weight is borne, at an awkard angle, by the bearers' hands, arms and shoulders, all of which soon become achingly tired. Visibility of the irregularities of the trail is obstructed by the stretcher itself, and the stretcher is carried too low to clear obstacles such as boulders, stumps, or the trunks of fallen trees. This process is so wearying that when the carry is to be more than a mile or two over rough trails, as many as 25 men are, whenever possible, assembled to evacuate a single adult.

A similar problem exists in situations in which it is necessary to evacuate persons from mines or tall buildings in which elevators are not operating, or to move goods too large or heavy to permit carriage by single bearers. Examples of the last would be mountain-warfare weapons, equipment for remote hunting or hiking camps, fire-fighting equipment, etc. In all such circumstances, an additional problem encountered is that of moving the bulky stretchers or carriers to the point of need.

While the description of my invention is directed primarily to the use of the carrier in carrying patients it should be understood that the carrier can also be adapted for use in carrying other loads.

It is the object of this invention to provide a stretcher and load carrier capable of being comfortably borne at head or shoulder height by a variable number of bearers, the number in each case being governed by the weight of the patient or load, the difficulty of the terrain, the length of the carry, etc.

It is a further object to provide a mechanism by means of which slightly injured or ill persons may be carried in a specially designed chair supported by this load carrier.

It is a further object to provide a stretcher or load carrier or chair carrier which can be disassembled or folded for easy transportation and which can be readily assembled at the point of need.

My invention consists of a carrier designed to be carried comfortably at the level of the heads or shoulders of the bearers in such fashion that all weight rests upon the bearers' backs and hips, just as it does in the carriage of a standard backpack. It accordingly makes demands only upon the body's strongest and most commonly used muscles, and does so in a comfortable, upright, and well-balanced position. Its design permits it to be borne by two, four, six or even more persons. In its use, even over rough, steep and rocky trails, four men in good condition can, without excessive strain, carry for many miles a patient of 100 pounds or less, while six can do the same with a full-sized adult.

Since the stretcher or load carrier is in some of its embodiments, carried at shoulder or at head height, the bearers' view of the trail, and hence their footing, is unimpeded; the load automatically clears most of the trail's obstructions. By the same token, urban rescue squads would find that it would nicely clear the banisters at each turn of many narrow open staircases. Both hands are left free to seize trees, rocks (or banisters) to aid balance. The carrier is so designed that the bearers may face in either direction relative to the patient or load being carried. This feature is important in the movement of injured persons, who must often be held consistently in a head-high or head-low position depending on the nature of their injuries.

The carrier is harnessed to the bearers' bodies by means of a backpack to which it is removably attachable. There are advantages in using the specially designed backpack, the design for which is a part of this invention. This backpack has mechanisms permitting adaption to the differing heights of bearers, as well as a load-levelling and shock-absorbing feature. However, one of this invention's virtues is that it can be used with a number of packs already on the market.

The bed of the stretcher, on which the patient or load lies, is divided at the foot end to form gutters in which the patient's legs rest in a spread-apart fashion when only two men are doing the carrying. This provides space between the patient's ankles for the head of the bearer whenever the carriage is in the direction of the patient's head. This arrangement is necessary to place the center of gravity of the patient or load at a point equidistant from each of the bearers; it also increases maneuverability by shortening the carrier's overall length.

Yoke arrangements provided at each end of the carrier adjustably receive and are supported by frame members of backpacks worn by the bearers. Through a telescopic mechanism these yokes are adjustable to permit the accomodation of either one or two bearers at each end. They also permit adaptation to a variety of backpack frames.

The carrier is provided with retractable legs the length of each of which is separately adjustable to accommodate to the irregularities of trails. These legs support the patient or other load while the bearers are strapping themselves into the packframes, resting, or reversing the direction of march.

One or more supplementary detachable yokes are provided for use at mid-points of the stretcher or load carrier to accommodate additional teams of bearers when required by the circumstances.

Finally, the carrier, with its yokes, is designed, through telescopic and hinged arrangements to be described later, to be readily assembled for use from a compacted position more suitable for transportation to the location of the patient or load.

BRIEF DESCRIPTION OF THE DRAWINGS

FIG. 1 is a top plan view of the carrier according to the invention and showing, schematically, the carrier supported by yokes at both ends on backpack frames on bearers and used as a stretcher.

FIG. 2 is a side view of the carrier of FIG. 1, without the schematic showing of the backpack frames.

DESCRIPTION OF THE PREFERRED EMBODIMENT

Figure 3:
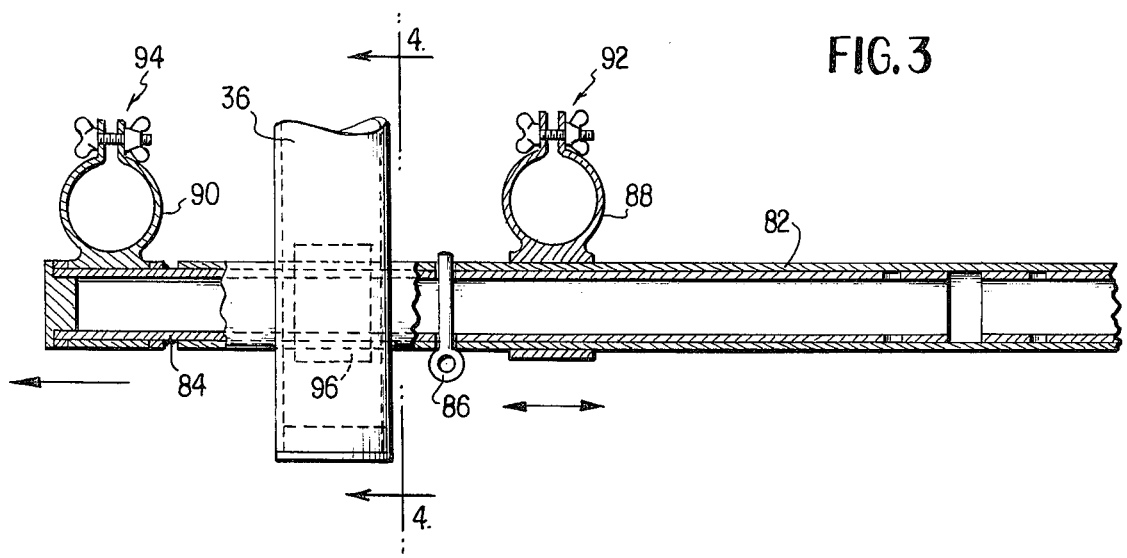
FIG. 3 is a view, as broken away and in partial section, of an end portion of a yoke shown in FIG. 1.
Figure 4:
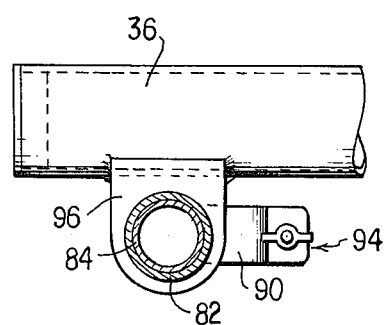
FIG. 4 is a sectional view taken along line 4—4 of FIG. 3.

As seen in FIG. 1 a carrier, generally designated at 12, and shown here for use as a stretcher, is adapted to be connected through yokes generally designated at 14 and 16, to backpack frames, three of which are shown in dash-dot lines at 18, 20 and 22. As diagramatically shown these pack frames, respectively, are worn by bearers 24, 26, and 28.

It will be noted that two bearers, 24 and 26, are at the right side of the Figure and these bearers face in the direction indicated by arrow 30. A single bearer, 28, is shown as facing in the same direction but, as will be explained later, yoke 16 can be adjusted so that, as in the manner of yoke 14, two bearers can utilize yoke 16. Conversely, it is also possible to adjust yoke 14 for use by one bearer. As will be explained later, all bearers may also face in the opposite direction when this is necessary.

THE FRAME

Looking both at FIGS. 1 and 2, the stretcher carrier 12 has a frame consisting of side frame members, which in the arrangement as disclosed in FIG. 1 are disposed in spacedapart generally parallel relationship and extending generally longitudinally with respect to the two possible directions of carriage, i.e., the direction shown by arrow 30 or its reciprocal. As will be explained below, these members are each made up of three members arranged to be selectively associated with each other in a telescopic manner.

Side frame member 32 has a central member 34, one end of which is telescopically received in a member 36 and is releasably held therein by pin 38. The other end of central member 34 telescopically receives an end of member 40 which can be releasably held therein by pin 42. While not shown, it will be understood that a plurality of matching holes can be provided at the respective ends of the members so that by positioning the pins 38 and 42 the overall length of the side frame member can be as desired.

As indicated by primed reference numbers, side frame member 44 is of similar construction to that of side frame member 32 and is secured in a like manner.

Suitable cross members 46 and 48 and 49 extend, respectively, between members 34 and 34', and 36 and 36' so as to brace the frame.

THE BODY

A suitable body portion for supporting the patient or load is secured to the frame members. As an example, and as shown in FIGS. 1 and 2, this body portion consists of sections 50 and 52, which are separately formed as molded plastic sections. Each section has a depressed central portion with outstanding lips at the upper peripheral surface thereof. Section 50 has lips 50' which are fastened in a desired manner, such as by fasteners 54, to members 34, 34' and 46. In a similar manner lips 52' of section 52 are secured by fasteners 56 to members 36, 36' and 48.

At this time it should be pointed out that section 52 has a split portion at its left-hand side which provides areas 58 and 60 to receive the legs of the patient. Such a construction permits a single bearer 28 to face toward the patient with his head between the ankles of the patient.

THE RETRACTABLE LEGS

Four extendable and retractable legs are provided for supporting the stretcher when required. The leg arrangements are generally designated 62, 64, 66 and 68. The arrangements are similar and attention is directed to FIG. 6 for a disclosure of the arrangement 62. The leg has a portion 70 telescopically receiving another portion 72 which is pivotally mounted on frame member 36' by pin 74. In a stowed position, as shown in full lines in FIG. 6, leg portions 70 and 72 are maintained along frame member 36' by suitable latch means, not shown, which can be a magnetic latch, a spring clip type of latch, or as desired.

The extended position of leg portions 70 and 72, to support the stretcher on the ground or other surface, is shown in dash-dot lines. In this position leg portion 72 is positioned by bracket members 76 and 78 and is maintained in an extended position with respect to leg portion 70 by any well known type of locking device, generally indicated at 80.

It will be understood that leg arrangements 64, 66 and 68 are arranged in a similar manner with regard to, respectively frame members 36, 34, and 34'.

THE COMPACTABILITY FEATURE

At this time it should be pointed out that by removing pins 38 and 38' the entire construction lying to the left of the break line 82 can be detached from the construction to the right of this line. Further, frame members 40 and 40', with yoke 14, can be either compacted into or detached from frame members 34 and 34', if desired, by removing pins 42 and 42'. This permits the various components to be readily placed together in a compact form, if desired, for transportation or storage. Of course the components may, if desired, be carried separately or stored separately.

THE YOKES

Turning now to a description of the yokes, attention is directed to FIG. 3. It will be appreciated, as seen there and in FIG. 1, that yokes 14 and 16 have telescopic tube arrangements, each yoke carrying two pairs of clamps. One pair is illustrated in FIG. 3. An outer tube 82 telescopically receives an inner tube 84. These tubes can be adjusted relative to each other and maintained at a desired position by means of a pin 86 received in aligned holes in the respective tubes. A desired number of holes can be provided in the tubes to accommodate the desired extent of relative positioning and the fineness of the adjustment.

Clamps 88 and 90 are secured to tubes 82 and 84, respectively. As seen in FIG. 3 the clamps 88 and 90 may be tightened by means of a bolt and wing nut 92 and 94, respectively.

While, as shown in FIG. 3, clamp 88 is fixed secure to tube 82, it is also desirable to mount the clamp in sliding engagement and provide any suitable locking device for maintaining the clamp on the tube in a desired position.

The above-described arrangements for varying the spacing between pairs of clamps both permit the yokes to be secured to frame members of different sized packs and also make possible the interchange between a one-bearer and a two-bearer configuration at each end of the carrier as seen in FIG. 1.

It is also desirable that the yokes be rotatable with respect to the associated members of the side frames of the carrier. This is necessary to permit the bearers to face in either direction, relative to the patient or load. In FIG. 3 tubes 82 and 84 are rotatably mounted within a bearing member 96 that depends from a side frame member, here shown to be member 36. It will be understood that a similar arrangement is provided at the connections of the yokes to members 36', 40 and 40'.

Figure 5:
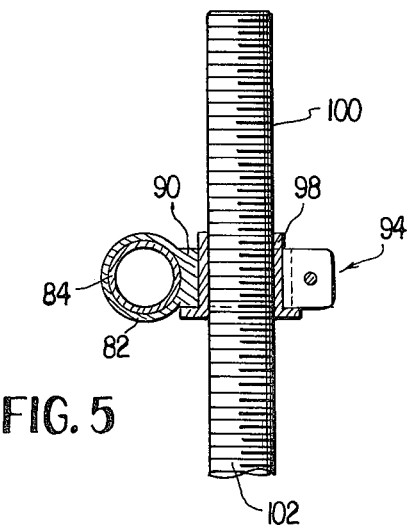
FIG. 5 is a view, partially in section, of a vertical portion of the frame of a backpack and an attachment to a yoke.
Figure 7:
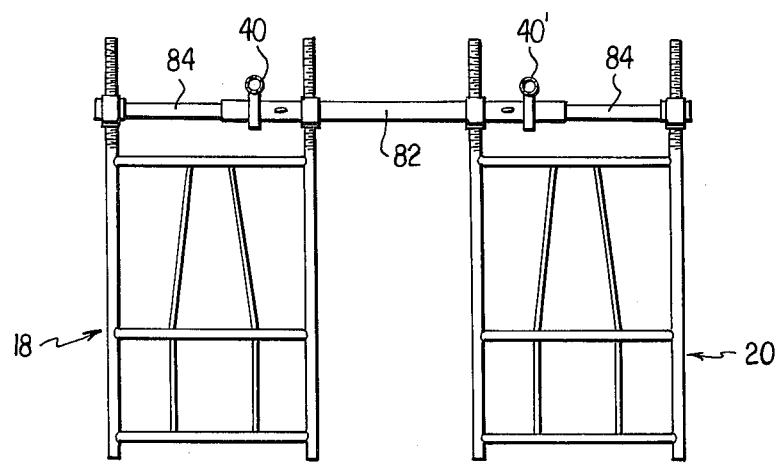
FIG. 7 is a schematic view of a yoke for the carrier as supported from two backpack frames.

Looking again at FIG. 7, and also looking at FIG. 5, it will be seen that the clamps of the yokes are adapted to be received on upright members of backpack frames. In FIG. 7 two backpack frames are shown so the two pairs of clamps are used but if a single backpack frame is to be used, as for example with a single bearer as shown at the left side of FIG. 1, then only one pair of clamps are received on the upright members of the backpack.

THE BACKPACKS

Any convenient means of positioning the clamps to a desired location on the associated upright members of the backpack frame can be provided. One such means can be a sleeve 98 that can be moved to a desired position along threads 100 of an upright member 102. A suitable locking means would be associated with the sleeve to permit it to be locked to the upright member at the desired position. (This arrangement provides for the necessary vertical adjustment required when the bearers are of different heights.)

The sleeve on the upright member receives a clamp of the yokes. For example, as seen in FIG. 5, clamp 90 is supported by the sleeve 98 and is clamped thereto when wing nut 94 is tightened. The other clamps and sleeves would be associated in a similar manner.

THE FOLDING VERSION

Figure 9:
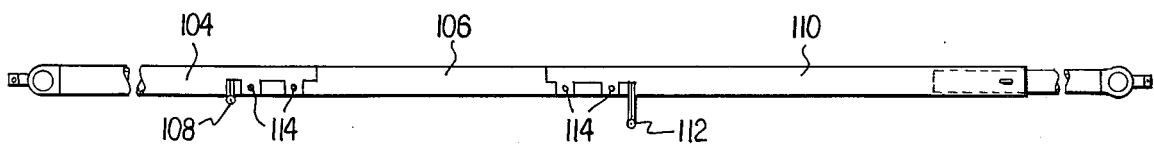
FIG. 9 is an elevational view of a portion of the carrier showing the carrier assembled through a plurality of hinged together sections.
Figure 10:
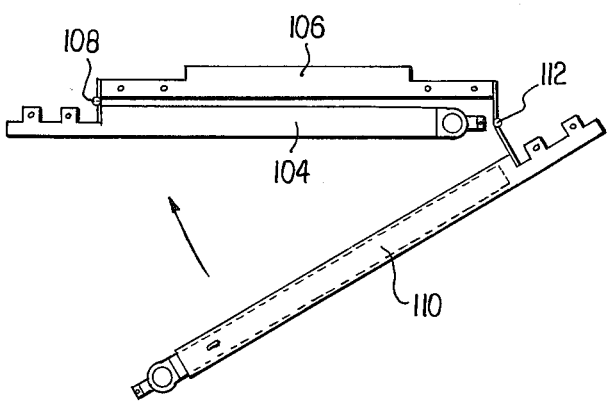
FIG. 10 is an elevational view of the carrier of FIG. 9 but with the sections being folded at their hinged connections, and telescoped into a compacted position.

The description so far has been directed to side frame members for the carrier which are telescopically associated for assembly and disassembly of the stretcher. The same objective of compactability can be achieved through the use of hinges as seen in FIGS. 9 and 10. Left-hand member 104 is connected to central member 106 by hinge 108. Right-hand member 110 is connected to this central member 106 by hinge 112. The members are maintained in rigid aligned position by means of pins 114 interconnecting the respective members at the fold areas. With these pins removed the member can be folded together in the manner seen in FIG. 10.

If the hinged arrangement is provided, as described above, the supporting portion on which the patient lies must be flexible so it can be folded with the members. For example, plastic sheeting can be used in that it can be folded in the manner of a canvas cot when it is disassembled to its compacted position.

THE SHOCK ABSORBER/LOAD EQUALIZER

Figure 11:
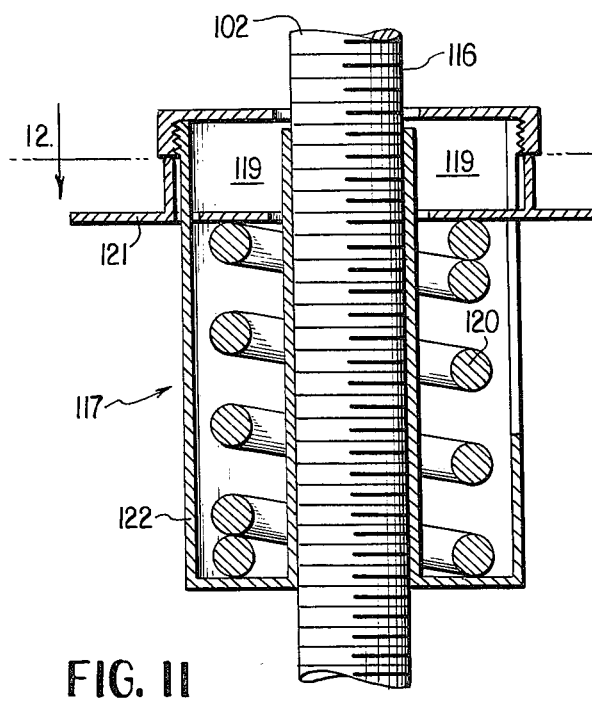
FIG. 11 is a schematic view of a load levelling and shock absorbing device constituting another embodiment of the mechanism for attaching the yoke to the backpack frame.
Figure 12:
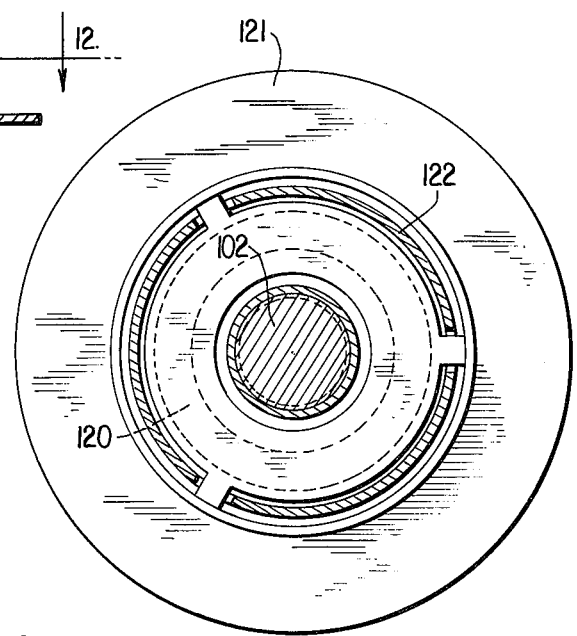
FIG. 12 is a sectional view taken along line 12—12 of FIG. 11.

A further embodiment of the means for clamping the yokes to upright members of the backpack is shown in FIG. 11. This serves both as a shock absorber and a load equalizer, diminishing the effect of unevennesses in the trail which can from time to time place a disproportionate part of the burden on one or the other of the two bearers at a given end. In this design, cylindrical sleeve generally designated at 117, which moves along threads 116 on the upright member 102 of the backpack frame is provided with annularly shaped chamber 119 in which rests a coil spring 120. Resting on top of the spring, and extending at three or four points to the outside of the cylinder through vertical slits in the cylinder wall 122 is a metal platform 121. The clamp on the carrier is attached to the portion of this platform external to the sleeve, thus transmitting the stretcher load's weight to the coil spring. As the weight imposed upon the individual bearer increases or decreases, the spring expands or contracts and the platform rides upwards or downwards in its slits. Since an identical process is underway on the backpack of the bearer's partner, differences in the loads resulting from vagaries of the trail are diminished. The coil springs are changeable to permit use of different size springs with different weight loads; for this purpose, a cap 123 of the sleeve is removable, it being screwed onto the body of the sleeve.

THE SUPPLEMENTAL YOKES

Figure 8:
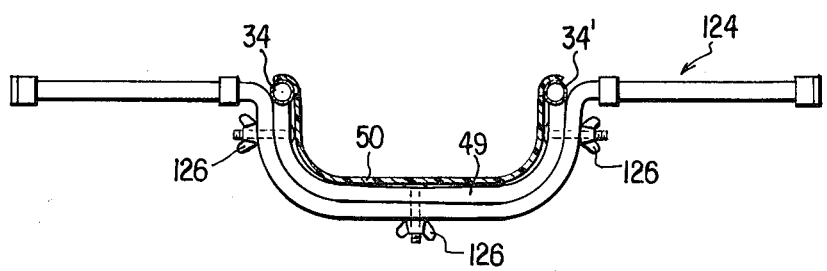
FIG. 8 is an elevational view, partially in section, showing a detachable supplementary yoke for use at one or more mid-points of the carrier when six or eight bearers are required.

To accommodate additional bearers when four do not suffice, a detachable supplementary yoke 124 is provided as shown in FIG. 8 which may be connected to cross-brace 49 by suitable means, such as bolts and wing nuts 126. Although not shown, other supplementary yokes could similarly be attached to cross-braces 46 and 48, permitting the accommodation of four additional bearers.

THE PENDULUM CHAIR

Figure 13:
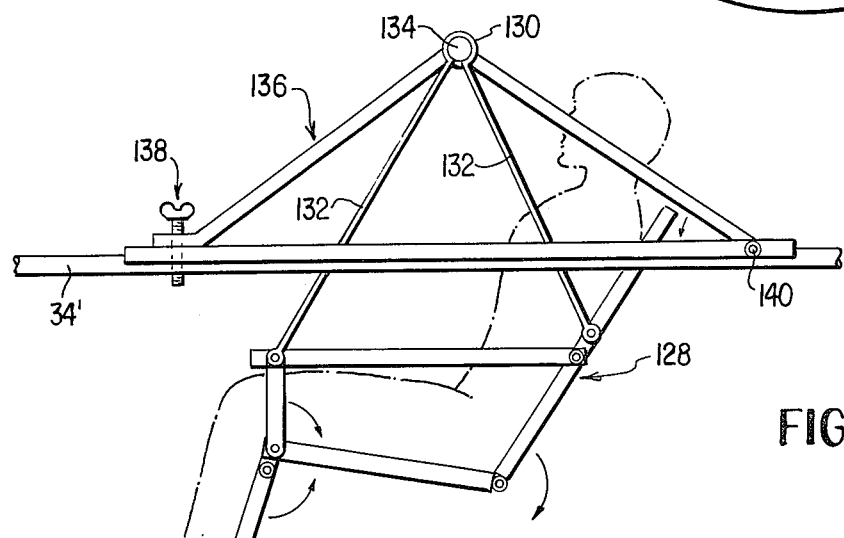
FIG. 13 is an elevational view of a portion of the carrier used in conjunction with a chair.
Figure 14:
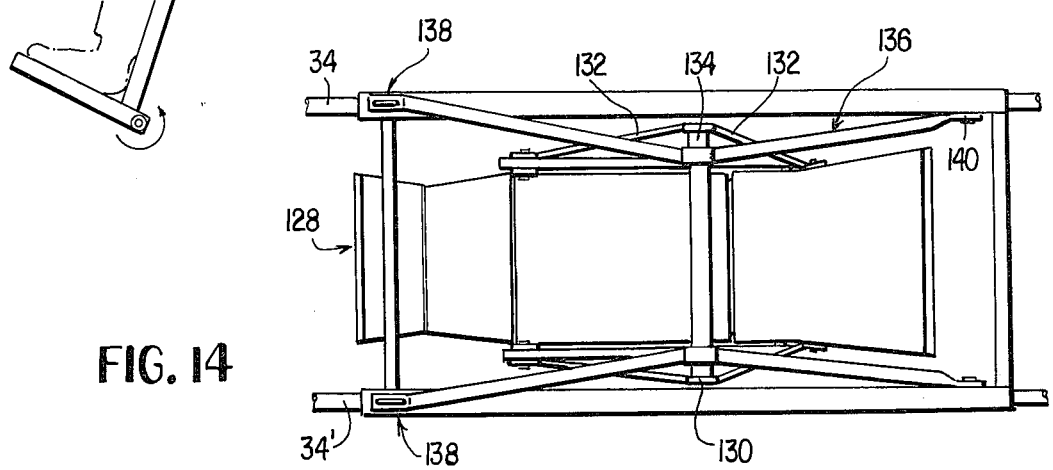
FIG. 14 is a top plan view of arrangement as shown in FIG. 13.

In many instances involving the transportation of exhausted, ill or slightly injured persons a portable chair arrangement is preferable to a stretcher. It can be lighter and shorter in length, and the patient may be more comfortable. The chair and the means of its attachment to the side frame members are shown in FIG. 13 and 14. The chair, generally designated at 128, which is foldable, is suspended from a hinge 130, located above the center of gravity of the patient, by means of supporting rods 132. It is thus able to swing through a considerable arc around the transverse horizontal axis of the carrier and remains level while the carrier tilts forward or back as the bearers climb or descend. The hinge is contained in a transversely disposed bar 134 supported by a rigid frame, generally designated at 136, which frame is removably attachable to the side frame members, for example 34 and 34', of the carrier by suitable fastenings such as pins or wing nuts shown generally at 138. Through use of suitable releasable pins or other fastenings the chair can be detached from the supporting rods and then be folded and laid flat for storage or transportation. The chair's folding mechanism is similar to many devices long in common use in garden and other types of furniture. By the same token, and for the same reason, the rigid frame is articulated and collapsible. This is accomplished by hinges 130 at the apex of the triangle formed by the frame on each side of the assembly, by a pin connection 140 and by the bolt or wing nut connection 138.

From the foregoing it will be understood that the components for the various kinds of uses (stretcher, goods carrier, pendulum chair) are detachable from the basic carrier and could thus be used interchangeably.

ASSEMBLY AND USE OF THE SYSTEM

Figure 6:
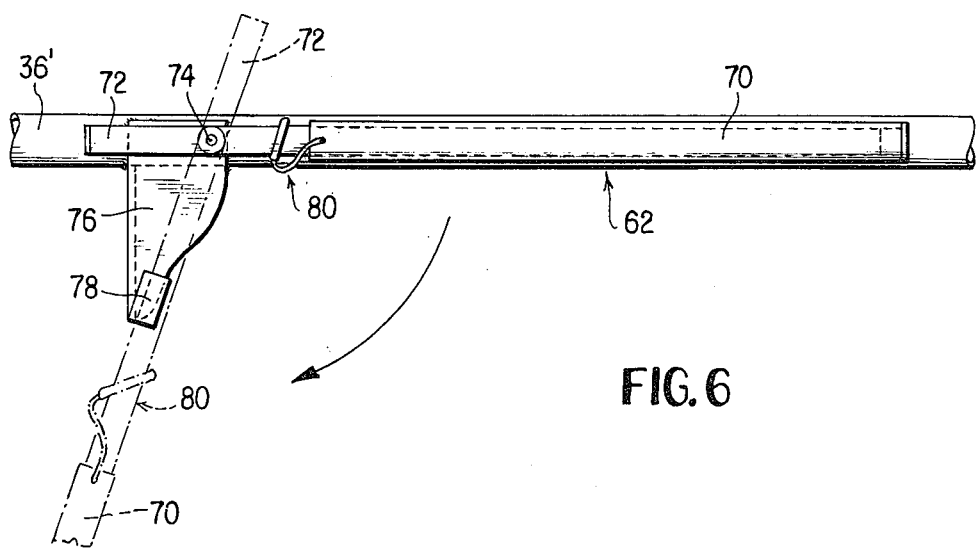
FIG. 6 is an elevational view of a portion of the carrier showing a foldable and telescopic leg on the carrier.

In use, the carrier, according to the invention, can be readily carried, in its compacted position or in separate units, to the patient. When the bearers arrive there, the units can be assembled as in the manner illustrated in FIG. 1. Adjustment of the side frame members, the telescopic tubes of the yoke, the clamps and the movable height-control sleeves attached to each backpack frame, and finally the attachment of the backpack frames themselves to the yokes, prepares the carrier for carriage by the desired number of bearers and in the desired manner, for example, as seen in FIG. 1. The legs of the carrier can be positioned as seen in FIG. 6 either before or after the patient or load is placed in the stretcher. While the legs may not be required or used in all situations, their use will in most circumstances facilitate the fastening of the backpacks to the yokes and the donning or removal of the packs. After the mission is accomplished the carrier can be disassembled in the manner previously described.

When the circumstances require the use of the pendulum chair, after the carrier is assembled as described above, the rigid frame which supports the chair is unfolded and fixed in its upright position by fastening its bolt or pin on each side. The rigid frame is then affixed to the side frame members of the carrier by appropriate wingnuts or other clamps. The pendulum chair is then unfolded and attached to the supporting rods which join it to the hinge mounted in the transverse bar. The chair is then ready for use.

What is claimed is:

1. In combination with at least two backpack frames to be worn by two human bearers respectively positioned on opposite ends of a load, the backpack frames each including vertically extending spaced rigid mounting members positioned on the backs of the bearers; a portable carrier for supporting the load, said carrier including longitudinally extending opposite spaced side frame members; and connecting means releasably securing opposite end portions of said side frame members to said mounting members of said backpack frames respectively at any one of selected vertical positions along said mounting members to enable the load to be carried by the bearers through means of the backpack frames worn thereby, said connecting means positively securing said side frame members to said mounting members while permitting rotational angular movement in a vertical plane therebetween to permit changes in the relative positions of said backpack frames and said carrier while the carrier is in use.

2. The combination defined in claim 1 wherein said connecting means includes at least one yoke member attached transversely across one of said end portions of said side frame members of the carrier, and interengaging fastening elements on said yoke member and the mounting members of the associated backpack frame.

3. The combination defined in claim 2 wherein said yoke member is rotatable about an axis extending transversely relative to the side frame members.

4. The combination defined in claim 1 wherein said backpack frame mounting members and said connecting means include mating threads for adjusting the position of the connecting means along the mounting members of the back-back frames.

5. The combination defined in claim 1 wherein said connecting means includes load leveling and shock absorbing means resiliently mounting said side frame members for movement in a vertical plane relative to the mounting members of the backpack frames.

6. The combination defined in claim 1 wherein said connecting means includes at least one pair of fastening elements at each end of said side frame members respectively secured to the mounting members of the associated backpack frame.

7. The combination defined in claim 1 wherein there are included two backpack frames at one end of said side frame members and said connecting means connects each said side frame member to one of said backpack frames at said one end of said side frame members.

8. The combination defined in claim 7 wherein connecting means includes fastening elements engaged on the mounting members of an associated backpack frame.

9. The combination defined in claim 1 wherein said connecting means includes yoke members carried by and across said side frame members with the yoke members extending laterally beyond the side frame members, said connecting means further including fastening elements mounted on said yoke members and releasably secured to the mounting members of the associated backpack frame.

10. The combination defined in claim 9 wherein said fastening elements include clamp members engaged about the mounting members of the associated backpack frame.

11. The combination defined in claim 10 wherein said yoke members have a central portion carrying two spaced apart clamp members and two extendable end portions adjustable with respect to said central portion, each of said two end portions having a clamp member thereon, which, together with an adjacent one of said clamp members on said central portion, forms a pair of clamp members.

12. The combination defined in claim 1 wherein said spaced apart side frame members of the carrier each carry, respectively, a pair of leg members each of which, in a first position, lies in a stowed position adjacent the associated side frame member and, in a second position, is extended to support the carrier in elevated position on a ground surface.

13. The combination defined in claim 12 wherein each of said leg members has means for independently adjusting the length thereof.

14. The combination defined in claim 1 wherein said connecting means and said mounting members of the backpack frames contain means for selectively adjusting the vertical position of the carrier relative to the backpack frames.

15. For use in the transportation of a portable carrier for a patient or other loads by at least two human bearers functioning in concert, an apparatus comprising in combination, a backpack frame and connecting means, said backpack frame having at least one rigid vertical member, and said vertical member having means for releasably receiving and positively securing at any one of selected vertical positions along its length said connecting means, and said connecting means being capable of releasably connecting and positively securing said vertical member to said carrier while permitting rotational angular motion in a vertical plane between said backpack frame and said carrier to permit changes in the relative positions of said backpack frame and said carrier while the apparatus is in use, whereby said backpack frame borne by a human bearer at one end of the carrier to which the backpack frame is secured by said connecting means may be used together with another backpack frame borne by another bearer at the opposite end of the carrier and connected to the opposite end of the carrier by a similar connecting means to transport a load held by the carrier.

16. Apparatus defined in claim 15 further including at least one yoke member to be releasably secured to the carrier in transverse relationship relative to the carrier and with opposite end portions of the yoke member extending laterally beyond the carrier, said yoke member having at least one fastening element mounted on each one of said opposite end portions thereof for releasable securement to a backpack frame.

17. Apparatus defined in claim 15 wherein said connecting means includes threads on and extending along the rigid vertical member of the backpack frame, and a fastening element received on the vertical member of the backpack frame and having threads engaged in said threads on said vertical member of the backpack frame.

* * * * *